IMPACT TOOL

Original Filed Dec. 13, 1968 2 Sheets-Sheet 1

INVENTOR
Murray L. Jayne
by Jabel, Baker, York, Jones & Dithmar
Att'ys

United States Patent Office

Re. 27,479
Reissued Sept. 19, 1972

27,479
IMPACT TOOL

Murray L. Jayne, Kenosha, Wis.

Original No. 3,565,183, dated Feb. 23, 1971, Ser. No. 783,611, Dec. 13, 1968. Application for reissue Feb. 25, 1971, Ser. No. 119,064
Int. Cl. B25d *9/04*
U.S. Cl. 173—13 14 Claims

Matter enclosed in heavy brackets [ ] appears in the original patent but forms no part of this reissue specification; matter printed in italics indicates the additions made by reissue.

ABSTRACT OF THE DISCLOSURE

An impact tool for loosening and breaking homogeneous material such as compacted or frozen earth, black top and concrete. The tool is adapted to be mounted on the boom of a backhoe or the like, and it is powered by the hydraulic system of the apparatus on which it is mounted or by a separate system. A tool element, such as a hardened point, is integral with or mounted on an anvil arranged for limited longitudinal movement in a housing. A hammer coacting with the anvil is energized by a spring, preferably a pneumatic spring. A hydraulic cylinder moves the hammer against the spring, and when the spring is compressed in desired amount, the piston rod of the cylinder is cammed away from the hammer, thereby permitting the spring to drive the hammer, thereby permitting the spring to drive the hammer with great force against the anvil. The tool is arranged so that operation thereof occurs only when the tool element or point is positioned against the work and the movable anvil has an inward relation with its housing, thereby providing a "dead man" control feature. In basic form the tool has a single hammer and a single cylinder.

Modifications of the basic tool contemplate a double cylinder, single hammer device which increases the frequency of operation by a factor of two, and a double cylinder, double hammer device which in effect is the combination of two single hammer, single cylinder devices in a single tool.

BACKGROUND OF THE INVENTION

This invention relates to impact tools, and more particularly to a massive impact tool capable of loosening and breaking homogeneous material such as compacted or frozen earth, black top surfacing and concrete.

Prior art known to applicant includes smaller pneumatic hammers, usually hand held, and larger impact tools operated under force of gravity by dropping from a height. Some prior impact tools in larger size are operated hydraulically or pneumatically in both directions by means of cylinders and associated valves. Such tools are complex in nature and are extremely costly, compared with the impact tool of the invention which is non-complex in design and subject to production and sale at comparatively low cost.

SUMMARY OF THE INVENTION

An impact tool embodying the invention includes a frame having an elongated housing open at its ends. A movable anvil is positioned in part within the housing, and a tool element is carried on the end of the anvil which protrudes from the housing. Suitable means are provided between housing and anvil for limiting the longitudinal movement of the anvil, the length of the travel path being of the order of about two inches. This feature, as will be seen, provides a "dead man" control of the impact tool.

A hammer, mounted for longitudinal movement within the housing, is adapted to deliver a striking blow to the anvil. The length of the travel path for the hammer preferably falls in the range of about three inches to eight inches, although the precise length is not critical. The design of housing, anvil and hammer is such that the hammer strikes the anvil only when the latter is positioned inwardly of its outermost position with respect to the housing, and, in fact, the hammer does not operate unless the anvil has inward position due to pressurized engagement with a work surface.

A cylinder having a piston therein, *or equivalent power means,* is pivoted to the frame, and the piston rod, or pusher means thereon, engages a pusher part on the movable hammer. An inclined cam means on the frame, *or equivalent,* causes disengagement of the piston rod or pusher means thereon from the pusher part of the hammer when the hammer is retracted to an ultimate position.

The hammer is retracted against a spring means, preferably a pneumatic spring means, and when the hammer is fully retracted, the spring means is effective to move the hammer rapidly against the anvil, thereby transferring energy from hammer to anvil to tool element, the latter delivering a disruptive impact force to the work.

The impact tool of the invention is adapted to be mounted on auxiliary apparatus, such as the boom of a backhoe or the like. The hydraulic system of the auxiliary apparatus, or a separate hydraulic system, is coupled to the cylinder *or power means* of the impact tool, and adjusted as to pressure and fluid flow rate to actuate the tool at desired frequency and as to amount of compression of the spring means which drives the hammer.

DESCRIPTION OF THE PREFERRED EMBODIMENTS

Figure 1:
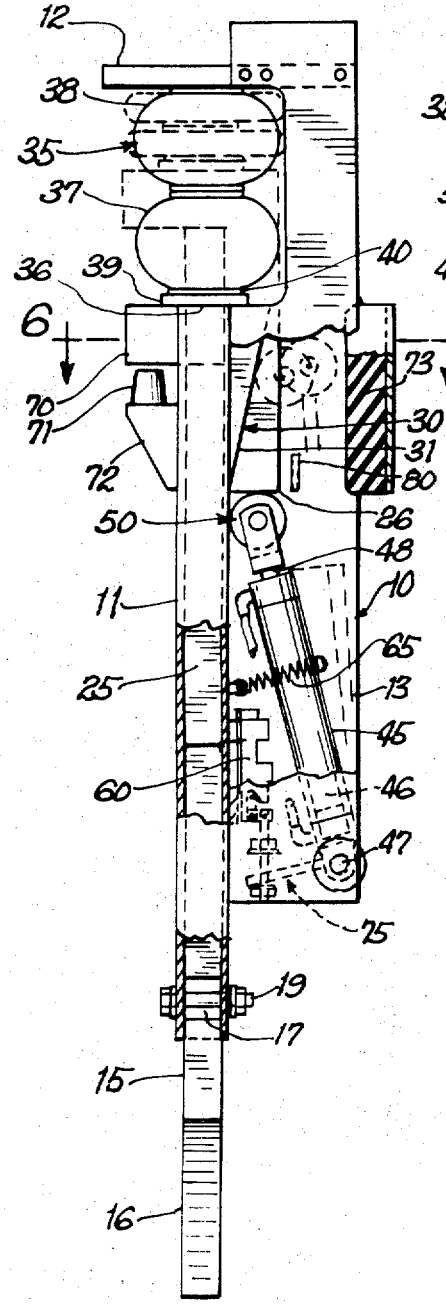
FIG. 1 is a front elevational view, partly broken away, of an impact tool embodying the invention, the tool having a single hammer and a single cylinder.

Referring now to the drawings, an impact tool of the single hammer, single cylinder type embodying the invention is shown in FIGS. 1a nd 2. This type constitutes a basic form of the invention.

Figure 2:
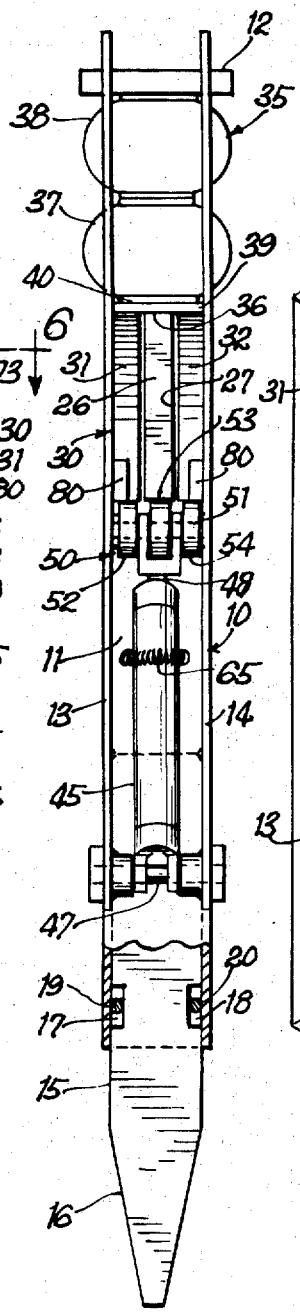
FIG. 2 is a side elevational view, partly broken away, of the impact tool shown in FIG. 1.
Figure 3:
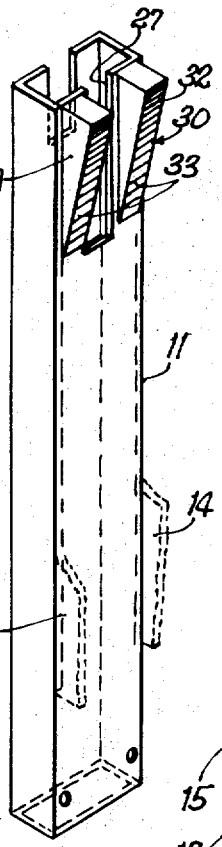
FIG. 3 is a perspective view of the housing portion of the frame of the impact tool shown in FIGS. 1 and 2.

The impact tool shown in FIGS. 1 and 2 has a frame generally designated 10 which includes an elongated housing 11. As shown, housing 11 (FIG. 3) is rectangular in cross section, but other cross sectional shapes may be used, e.g., circular. Frame 10 also includes a top plate 12 and longitudinally extending spaced side plates 13 and 14, best shown in FIG. 2. The various parts of frame 10 are metal and rugged in character as befitting the heavy duty nature of the impact tool.

Figure 5:
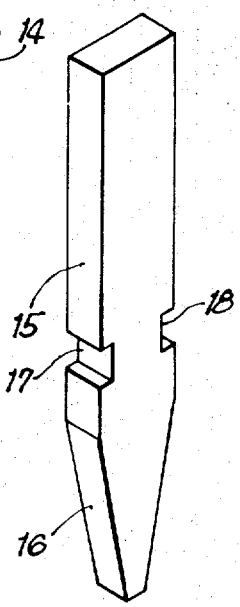
FIG. 5 is a perspective view of the anvil shown in FIGS. 1 and 2.

A comparatively massive anvil 15 (FIG. 5) is disposed in part within the lower end portion of housing 11. The end portion of the anvil part which protrudes from housing 11 comprises or carries a tool element 16 which simply may be a tapered end portion of the anvil. Tool element 16, of course, is sufficiently durable to perform its intended function of dislodging and breaking up materials such as compacted or frozen earth, black top surfacing and concrete.

Suitable means are provided between housing 11 and anvil 15 to limit the longitudinal movement of the anvil with respect to the housing. As here shown, aligned portions of the opposing sides of anvil 15 are cut way, as best shown at 17 and 18 in FIGS. 2 and 5, and bolts 19 and 20 extend through housing 11 in positions to be embraced within the recesses defined by cut-outs 17 and 18. The longitudinal length of the recesses may be a little over two inches so that the travel length of anvil 15 is about two inches. The foregoing feature of limiting the movement of the anvil, as will be seen, cooperates to provide a "dead man" control of the impact tool.

Figure 4:
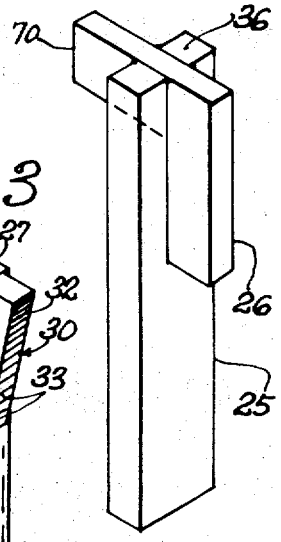
FIG. 4 is a perspective view of the hammer shown in FIGS. 1 and 2.

An elongated hammer 25 (FIG. 4) is disposed within the upper portion of housing 11 in alignment with anvil 15. Hammer 25, as will be seen, is movable longitudinally within housing 11 and is adapted to deliver a striking blow to anvil 15.

Hammer 25 includes a pusher part 26 which, as here shown, extends laterally from one side of the hammer through an elongated openings 27 (FIGS. 2 and 3) in the adjacent wall of housing 11. Pusher part 26 is engaged by a moving element on a cylinder assembly, presently to be described, *or equivalent power means*, which functions to retract hammer 25, i.e., push the hammer upwardly.

*In the form of the invention shown,* [Inclined] cam means 30 is mounted on housing 11 in effective relation with pusher part 26 of hammer 25. As here shown, cam means 30 comprises a pair of inclined plates 31 and 32 mounted one on each side of opening 27, the outer edges 33 (FIG. 3) of the plates tapering outwardly from bottom to top. The function of cam means 30 will be described presently.

A spring means generally designated 35 is disposed in the upper portion of frame 10 in effective relation with the upper end of hammer 25. The upper end of spring means 35 bears against and is secured to top plate 12 of frame 10, and the lower end bears against the top end 36 of hammer 25. As here shown, spring means 35 comprises a pair of conventional pneumatic springs 37 and 38, the spring 37 optionally being provided with a heavy plate 39 to reinforce the lighter plate 40 forming part of the spring.

[A] *In the illusrtated form of the invention a* conventional cylinder 45 having a piston 46 (FIG. 1) therein is pivoted in frame 10 by means of pivot pin 47, the pin 47 having spaced relation with housing 11 of the frame. Piston 46 has a protruding rod 48 which directly or indirectly engages pusher part 26 of hammer 25.

Piston rod 48, as here shown, carries at its free end a pusher means in the form of a roller means 50 comprising, as best shown in FIG. 2, a pin 51 which carries three rollers 52, 53 and 54. Central roller 53 engages pusher plate 26, while outer rollers 52 and 54 engage cam plates 31 and 32.

A valve 60, preferably of the two-position spool type, is provided to control the outward and inward movement of piston 46 in cylinder 45. In preferred form, valve 60 is supplied with oil under pressure from a suitable system such as the hydraulic system of the apparatus on which the impact tool is mounted or a separate auxiliary system (not shown).

A resilient means such as spring 65 extends between housing 11 and cylinder 45, such means being effective to move the free end of cylinder 45 toward housing 11 when piston 46 is retracted, as shown in FIG. 1, so that pusher or roller means 50 on piston [46] *rod 48* may engage pusher part 26 of hammer 25 when anvil 15 has positioned hammer 25 to permit the engagement.

A recoil part 70 (FIGS. 1 and 4) extends laterally from another side of hammer 25, the side shown being opopsite that of pusher [plate] *part* 26. A resilient recoil bumper 71 (FIG. 1) of suitable material such as rubber is mounted either on recoil part 70, or, as shown, on an aligned second recoil part 72 secured to housing 11.

Figure 6:
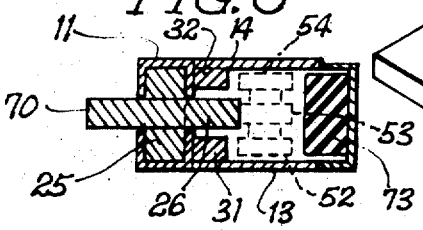
FIG. 6 is a sectional view on line 6—6 of FIG. 1.
Figure 7:
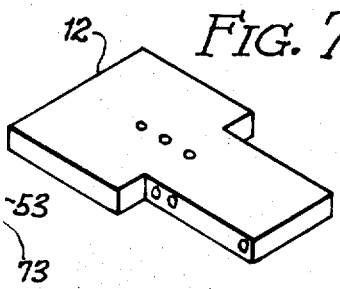
FIG. 7 is a perspective view of the top plate forming part of the frame shown in FIGS. 1 and 2.

Referring to FIGS. 1 and 6, side plates 13 and 14 of frame 11 carry a second resilient bumper 73 which is engaged by pusher or roller means 50 when the latter is cammed away abruptly from pusher part 26 of the hammer. Bumper 73 is omitted in FIG. 2 for clarity.

In operation, the impact tool of the invention is positioned by the apparatus on which it is mounted (e.g., a backhoe) so that tool element 16 is in engagement with the work material to be dislodged and broken, such as impacted or frozen earth, black top surfacing or concrete. The tool is pressed against the work so that anvil 15 has an inward position with respect to housing 11. In this position, anvil 15 has moved hammer 25 to a partially retracted position, as shown in FIG. 1. In this position of hammer 25, the "dead man" control feature permits tool operation.

When hammer 25 is in such partially retracted position, resilient means 65 is able to draw pusher or roller means 50 against housing 11, as shown in FIG. 1. Pusher or roller means 50 in such position bears against pusher part 26. Cylinder 45 is energized by valve 60, and piston rod 48 and associated pusher or roller means 50 function to retract hammer 25 against spring means 35, thereby storing energy in the spring means.

When hammer 25 is retracted and spring means 35 compressed in desired amounts, pusher or roller means 50, by reason of cam means 30, *or equivalent*, has been moved outwardly from housing 11 a distance sufficient to release pusher or roller means 50 from pusher part 26. When this occurs, hammer 25 no longer is restrained from downward movement, and the energy stored in spring means 35 is released instantaneously to drive hammer 25 downwardly with great speed. The downward travel of hammer 25, of course, is stopped abruptly when the hammer strikes anvil 15. The impact, of course, is communicated through anvil 15 to tool element 16 and thence to the work, which in consequence is loosened and broken.

Meanwhile, valve 60 has reversed itself either as a result of differential pressure occurring at the end of the piston stroke or mechanical linkage 75 (FIG. 1) with cylinder 45, causing piston 46 and pusher or roller means 50 to retract into position for the next forward stroke against pusher part 26 of hammer 25. The tool continues to cycle automatically until either the oil pressure in valve 60 is relieved or the tool is elevated so that anvil 15 has an outermost position, enabling hammer 25 to lower against bumper 71 to a level making it impossible for pusher or roller means 50 to be drawn against housing 11 in position to engage pusher part 26 for a subsequent tool cycle of operation.

Recoil parts 70 and 72 and resilient bumper 71 are provided, in addition to the aforesaid limitation on downward hammer movement, as a safety feature to prevent undue strain on the tool in the event that anvil 15 occupies a critical position that permits cycling of the tool at a time when anvil 15 does not receive full impact. In such circumstance the impact is received by bumper 71 and not by the bolts 19 and 20 which limit outward movement of anvil 15.

Keeper plates 80 (FIGS. 1 and 2) mounted on frame 10 may be provided to prevent premature engagement of pusher or roller means 50 with pusher part 26 of hammer 25, as might occur in the event hammer 25 bounces away from anvil 15 following impact. Keeper plates 80 insure that pusher or roller means 50 has spaced relation with housing 11 for a time period insuring that hammer 25 is in position for proper engagement by roller means 50. Keeper plates or the like for this purpose are particularly important in a modified impact tool having a single hammer and two cylinders, next described.

Figure 8:
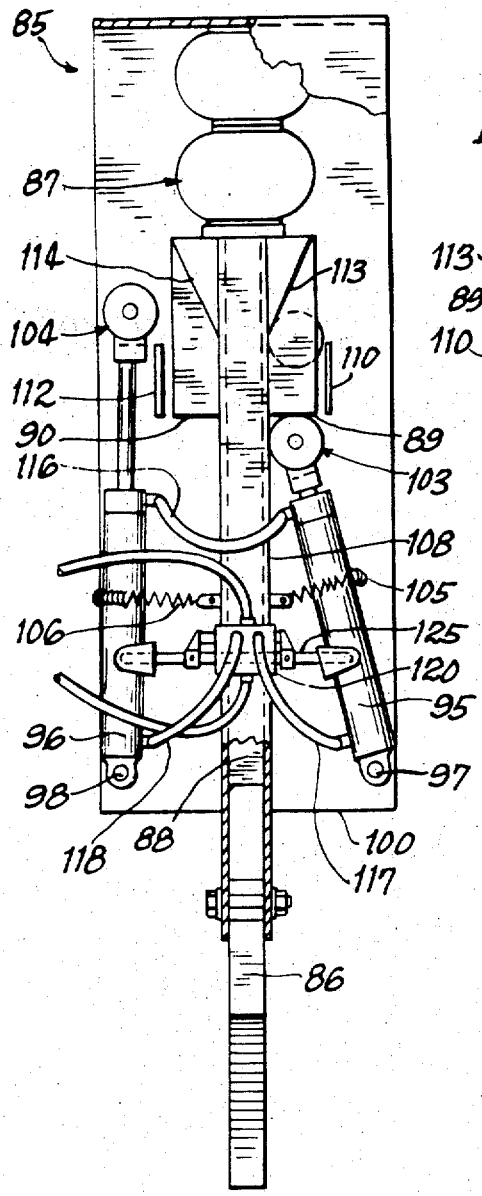
FIG. 8 is a somewhat diagrammatic front elevational view, partly broken away, of a modified impact tool embodying the invention, the tool having a single hammer and two cylinders.

Referring to FIG. 8, modified tool 85 includes a single anvil 86, spring means 87, and a single hammer 88 having pusher parts 89 and 90 on opposing sides.

Modified tool 85 also includes two cylinders 95 and 96 pivotally mounted at 97 and 98 to frame 100, the cylinders respectively having pusher means 103 and 104 in effective relation with pusher parts 89 and 90 of hammer 88. Spring means 105 and 106 extend respectively between cylinders 95, 96 and housing 108 which encloses hammer 88 to urge the free ends of the cylinders toward the housing.

Figure 9:
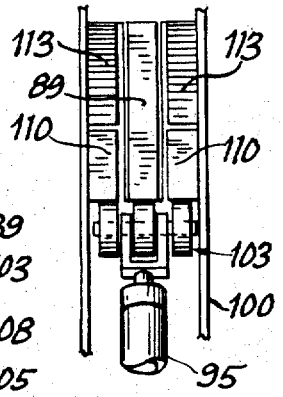
FIG. 9 is a fragmentary side elevational view of the adjacent portion of FIG. 8.

Keeper plates 110—110, best shown in FIG. 9, are mounted on frame 100 to insure that pusher means 103 on its return travel is held away from housing 108 until pusher part 89 of hammer 88 has reached the "down" position shown in FIG. 8. Similar keeper plates 112 are mounted in corresponding manner on the opposite side of the tool in effective relation with pusher part 90 and pusher means 104 of cylinder 96.

Inclined cam means 113—113, *or equivalent*, best shown in FIG. 9, are mounted on housing 108 in effective relation with pusher part 89 of hammer 88, and corresponding cam means 114—114 (FIG. 8), *or equivalent*, are mounted on the opposite side of housing 108 in effective relation with pusher part 90.

Cylinders 95 and 96 have suitable hydraulic connections, including interconnecting tube 116 and tubes 117 and 118 leading from control valve 120 which may be mounted on frame 100. A slide bar 125 moved back and forth by pivoting cylinders 95 and 96 actuates valve 120 to operate the cylinders alternately.

In operation, the piston in cylinder 96 extends, as shown in FIG. 8, at the time the piston in cylinder 95 retracts, and vice versa. With this arrangement, for a given flow rate in the hydraulic system, the frequency of tool operation in terms of impacts delivered by the single hammer is about twice that of the single cylinder tool shown in FIGS. 1–7.

Keeper plates 110—110 and 112—112 function, as mentioned, to prevent premature engagement of pusher means 103 and 104 with pusher parts 89 and 90. Premature engagement, of course, would be disruptive of proper operation and result in malfunction of the hydraulic system.

Figure 10:
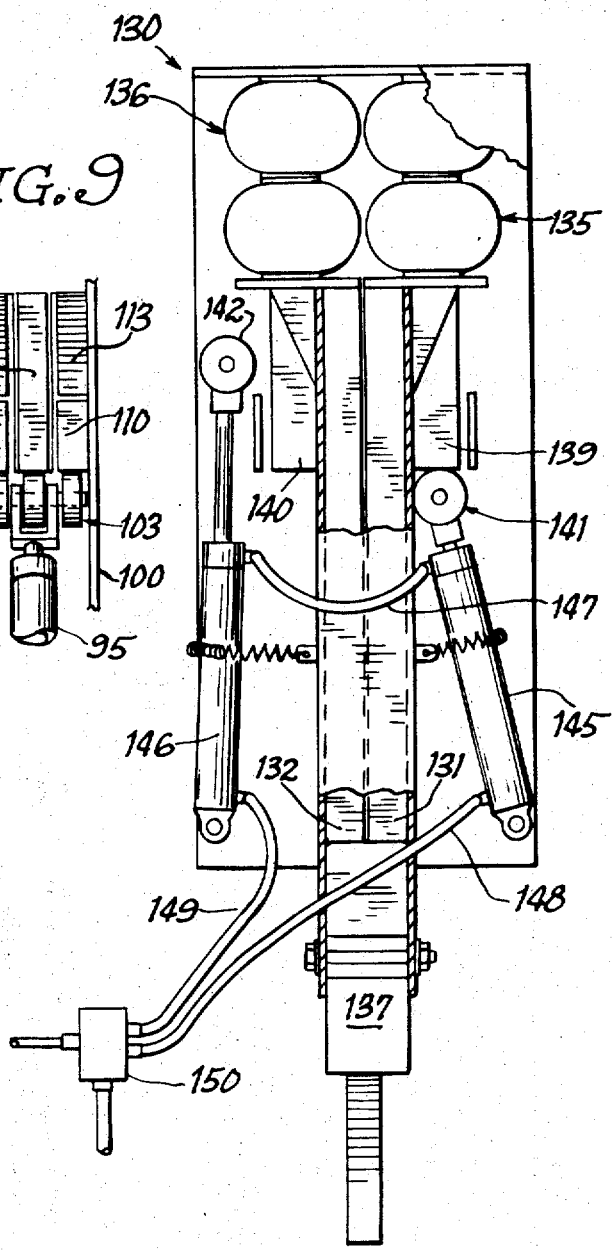
FIG. 10 is a somewhat diagrammatic front elevational view, partly broken away, of another modified impact tool embodying the invention, the tool having two hammers and two cylinders.

A further modification of the basic single hammer, single cylinder tool is a double hammer, double cylinder tool 130 shown in FIG. 10. Tool 130 is generally like the double cylinder tool 85 of FIG. 8 except that tool 130 has two hammers 131 and 132 and two spring means 135 and 136, one for each hammer. The two hammers 131 and 132 work in alternation against a single anvil 137.

Hammers 131 and 132 have pusher parts 139 and 140, respectively, which are engaged respectively by pusher means 141 and 142 of pivoted cylinders 145 and 146.

A tube 147 in the hydraulic system connects the free ends of the two cylinders 145 and 146, and the other ends of the cylinders are connected by tubes 148 and 149 to a control valve 150 which may be remotely mounted and pressure actuated.

The two hammers 131 and 132 work in alternation and deliver successive blows to anvil 137. Thus, if cylinders 145 and 146 each operate at the same frequency as the single cylinder used in the tool shown in FIGS. 1–7, the impacts delivered by anvil 137 to the work will have twice the frequency of the impacts of the single cylinder tool.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. An impact tool comprising:

a frame including an elongated housing open at the ends;

an anvil within and protruding from one end of said housing, said anvil longitudinally movable within said housing and having a tool element at the end thereof exterior of said housing;

means between said housing and anvil limiting longitudinal movement of said anvil;

a hammer within said housing, said hammer longitudinally movable and adapted to deliver a striking blow to said anvil, said hammer having a pusher part;

cam means on said frame in effective relation with said pusher part;

spring means on said frame in effective relation with said hammer;

a cylinder pivoted to said frame;

a piston in said cylinder, said piston having pusher means adapted to engage said pusher part to retract said hammer against said spring means and to engage said cam means, whereby said pusher means disengages said pusher part when said spring means is compressed, thereby permitting said spring means to move said hammer rapidly against said anvil; and means moving said piston outwardly and inwardly of said cylinder, said impact tool in operative condition when said tool element engages a work surface and said anvil is positioned inwardly of its outermost limit of movement.

2. The combination of claim 1 with the addition of resilient means urging the free end of said cylinder toward said housing, whereby said pusher means when said piston is retracted is in position to engage said pusher part.

3. The combination of claim 1 with the addition of aligned recoil parts on said hammer and said frame, and a resilient recoil bumper on one of said parts.

4. The combination of claim 1 with the addition of a resilient bumper on said frame in position to be engaged by said pusher means when the latter is cammed away from said pusher part.

5. The combination of claim 1 wherein said spring means comprises at least one air spring.

6. The combination of claim 1 wherein said pusher part on said hammer extends laterally through an opening in said housing.

7. The combination of claim 1 wherein said pusher means on said piston comprises a roller means for engaging said pusher part and said cam means.

8. The combination of claim 1 wherein said pusher part on said hammer extends laterally through an opening in said housing and said cam means comprises a pair of plates mounted one on each side of said housing opening, the outer edges of said plates tapering outwardly from bottom to top, and said pusher means on said piston comprises three side by side rollers, the center roller engaging said pusher part of said hammer and the outer rollers engaging the tapering edges of said plates.

9. The combination of claim 1 wherein said means moving said piston includes a valve on said frame and a mechanical linkage interconnecting said pivoted cylinder and said valve.

10. The combination of claim 1 wherein said hammer has a second pusher part and said frame has a second inclined cam means in effective relation with said second pusher part, and with the addition of a second cylinder pivoted to said frame, a piston in said second cylinder having pusher means adapted to engage said second pusher part and means moving said piston of said second cylinder outwardly and inwardly as said piston of the first cylinder moves inwardly and outwardly.

11. The combination of claim 10 with the addition of keeper plates on said frame positioned to prevent said pusher means of said pistons from engaging said pusher parts of said hammer until after said pistons are fully retracted and said hammer has bottomed on said anvil.

12. The combination of claim 1 with the addition of a second hammer in said housing in side by side relation with the first hammer, said second hammer having a pusher part, a second spring means in said frame in alignment with said second hammer, a second cylinder pivoted to said frame, a piston in said second cylinder having pusher means coacting with said pusher part of said second hammer, and means moving said piston of said second cylinder outwardly and inwardly as said piston of the first cylinder moves inwardly and outwardly.

13. An impact tool comprising:

a frame including an elongated housing open at the ends;

an anvil within and protruding from one end of said housing, said anvil longitudinally movable within said housing and having a tool element at the end thereof exterior of said housing;

means between said housing and anvil limiting longitudinal movement of said anvil;

a hammer within said housing, said hammer longitudinally movable and adapted to deliver a striking blow to said anvil, said hammer having a pusher part;

spring means on said frame in effective relation with said hammer;

a cylinder assembly pivoted to said frame including a cylinder and piston therein having protruding pusher means adapted to engage said pusher part to retract said hammer against said spring means;

cam means cooperating with said frame and said cylinder assembly and mounted on one of them for causing said pusher means to disengage from said pusher part when said spring means is compressed, whereby said compressed spring means moves said hammer rapidly against said anvil; and means moving said piston outwardly and inwardly of said cylinder, said impact tool in operative condition when said tool element engages a work surface and said anvil and hammer are positioned inwardly of their outermost limits of movement so said pusher means of said piston is able to engage said pusher part of said hammer in driving manner.

14. An impact tool comprising:

a frame including an elongated housing open at each end;

an anvil and tool element within and protruding from one end of said housing;

a spring means adjacent the other end of said housing and spaced from said anvil;

means accommodating limited movement of said anvil toward and away from said spring means;

a longitudinally movable hammer within said housing between said anvil and said spring means;

a pusher part extending laterally from said hammer;

a power cylinder assembly pivotally mounted in said frame having a cylinder and a piston rod protruding therefrom;

pusher means on the end of said piston rod engageable with said pusher part of said hammer;

means to actuate said cylinder assembly so said pusher means moves said hammer to compress said spring means; and means cooperating with said housing and said cylinder assembly and mounted on one of them for urging said pusher means of said piston rod out of engagement with said pusher part of said hammer, thereby releasing said spring means and causing said hammer to strike an impact blow against said anvil, said impact tool in operative condition when said anvil tool element engages a work surface and said anvil and hammer are positioned inwardly of their outermost limits of movement so said pusher means of said piston rod is able to engage said pusher part of said hammer in driving manner.

References Cited

The following references, cited by the Examiner, are of record in the patented file of this patent or the original patent.

UNITED STATES PATENTS

| | | | |
|---|---|---|---|
| 1,634,623 | 7/1927 | Miller | 173—13 |
| 3,498,661 | 3/1970 | Graziano | 173—119 |
| 3,321,033 | 5/1967 | Benuska et al. | 173—119 |
| 3,358,779 | 12/1967 | Cunningham | 173—119 |

ERNEST R. PURSER, Primary Examiner

U.S. Cl. X.R.

173—101, 120; 173—124